United States Patent
Mueller

(10) Patent No.: US 9,571,277 B2
(45) Date of Patent: Feb. 14, 2017

(54) METHOD FOR GENERATING A KEY IN A NETWORK AND USER ON A NETWORK AND NETWORK

(71) Applicant: Robert Bosch GmbH, Stuttgart (DE)

(72) Inventor: Andreas Mueller, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 58 days.

(21) Appl. No.: 14/711,219

(22) Filed: May 13, 2015

(65) Prior Publication Data
US 2015/0334093 A1    Nov. 19, 2015

(30) Foreign Application Priority Data
May 13, 2014   (DE) ........................ 10 2014 208 975

(51) Int. Cl.
*H04L 29/06*    (2006.01)
*H04L 9/08*    (2006.01)

(52) U.S. Cl.
CPC ......... *H04L 9/0875* (2013.01); *H04L 63/0428* (2013.01); *H04L 63/061* (2013.01)

(58) Field of Classification Search
CPC ........................................................ H04L 29/06
See application file for complete search history.

(56) References Cited

U.S. PATENT DOCUMENTS

| | | | | |
|---|---|---|---|---|
| 7,945,544 | B2* | 5/2011 | Farber | G06F 17/30091 707/698 |
| 8,621,216 | B2* | 12/2013 | Husa | H04L 9/0861 380/260 |
| 2002/0169966 | A1* | 11/2002 | Nyman | H04L 63/0407 713/182 |
| 2006/0099929 | A1* | 5/2006 | Frank | H04L 63/0428 455/411 |
| 2007/0036353 | A1* | 2/2007 | Reznik | H04B 7/0434 380/30 |

(Continued)

FOREIGN PATENT DOCUMENTS

| WO | WO96/23376 | 8/1996 |
|---|---|---|
| WO | WO2006/081122 | 8/2006 |

*Primary Examiner* — Hadi Armouche
*Assistant Examiner* — Ali Shayanfar
(74) *Attorney, Agent, or Firm* — Norton Rose Fulbright US LLP; Gerard Messina

(57) ABSTRACT

A method for generating a key in a network. The network includes at least one first user and one second user having a secured communication link to one another, and a third user, to which a secured communication link is to be established. The first user and the third user each generate a first partial value sequence from properties of the transmission channel between the first user and the third user. The second user and the third user each generate a second partial value sequence from properties of the transmission channel between the second user and the third user. In a secured part of the network, which includes at least the first and the second user, but not the third user, the key is ascertained from at least the first partial value sequence of the first user and the second partial value sequence of the second user. The key is also generated in the third user from at least the first partial value sequence and the second partial value sequence.

15 Claims, 3 Drawing Sheets

(56) References Cited

U.S. PATENT DOCUMENTS

| | | | | |
|---|---|---|---|---|
| 2007/0178885 A1* | 8/2007 | Lev | ................... | H04L 63/083 |
| | | | | 455/411 |
| 2013/0311783 A1* | 11/2013 | Heidenreich | ......... | H04L 9/3247 |
| | | | | 713/176 |
| 2014/0086177 A1* | 3/2014 | Adjakple | .............. | H04W 12/08 |
| | | | | 370/329 |

* cited by examiner

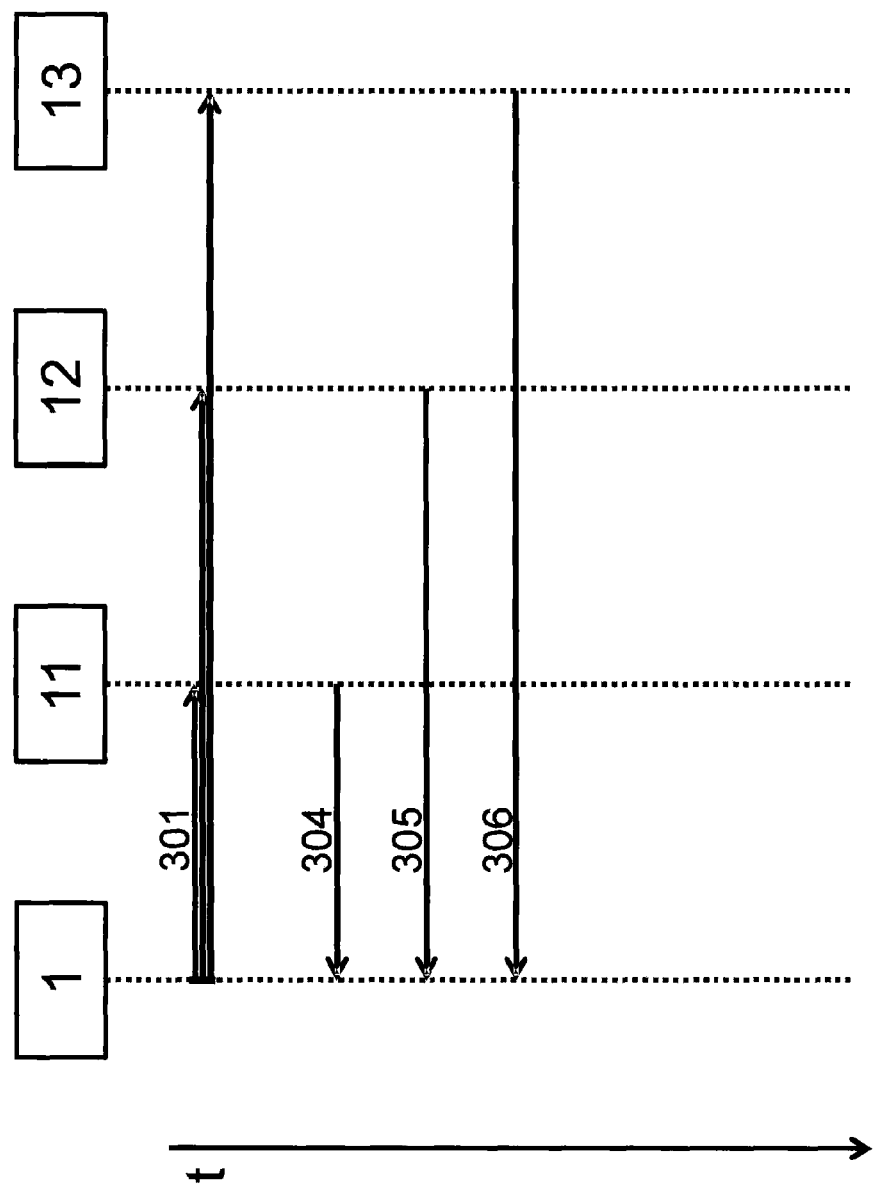

METHOD FOR GENERATING A KEY IN A NETWORK AND USER ON A NETWORK AND NETWORK

FIELD OF THE INVENTION

The present invention relates to methods for generating a secret, cryptographic key in a network, in particular generating a shared, secret key between the network and a user, and users on a network, which are configured to carry out such methods.

BACKGROUND INFORMATION

Secure communication between various devices is becoming more and more important in an increasingly networked world and represents an essential requirement for the acceptance and therefore also the economic success of the corresponding applications in many areas of application. This includes—depending on the application—various protection goals, for example, ensuring the confidentiality of the data to be transmitted, mutual authentication of the participating nodes, or securing the data integrity.

To achieve these protection goals, suitable cryptographic methods are typically used, which may generally be divided into two different categories: symmetrical methods, in which transmitter and receiver have the same cryptographic key, and asymmetrical methods, in which the transmitter encrypts the data to be transmitted using the public key (i.e., which is also possibly known to a potential attacker) of the receiver, but the decryption may only take place using the associated secret key, which is ideally only known to the legitimate receiver.

Asymmetrical methods have the disadvantage, inter alia, that they generally have a very high computational complexity. Therefore, they have only limited suitability for resource-restricted nodes, for example, sensors, actuators, etc., which typically only have a relatively low computing power and a small memory space and are to operate energy efficiently, for example, because of battery operation or the use of energy harvesting. In addition, only a limited bandwidth is often available for data transmission, which makes the exchange of asymmetrical keys, having lengths of 2048 bits or even more, unattractive.

In contrast, it must be ensured in the case of symmetrical methods that both receiver and transmitter have the same key. The associated key management generally represents a very demanding task. In the field of mobile wireless, keys are introduced with the aid of SIM cards into a mobile telephone, for example, and the associated network may then assign the unique identifier of a SIM card to the corresponding key. In the case of wireless LANs, in contrast, a manual input of the key to be used typically takes place ("pre-shared keys", generally established by the input of a password) during the setup of a network. However, such key management rapidly becomes very complex and impractical if one has a very large number of nodes, for example, in a sensor network or other machine-to-machine communication systems. In addition, a change of the keys to be used is often possible not at all or only with very great effort.

For some time, novel approaches have therefore been studied and developed under the keyword "physical layer security," with the aid of which keys for symmetrical methods may be generated automatically on the basis of the transmission channels between the involved nodes. Ascertaining random numbers or pseudorandom numbers from channel parameters may be inferred, for example, from WO 1996/023376 A2, and generating secret keys from channel parameters is described in WO 2006/081122 A2.

Heretofore, above all approaches have been considered and studied in the literature in which the above-described key generation takes place directly between two nodes.

SUMMARY

The present invention relates to methods and users on a network or networks which are configured to carry out one of the methods. Furthermore, the present invention relates to a computer program which is configured to carry out one of the methods.

The present invention proceeds from a network having at least three users. User on the network means that each user may communicate with at least one further user of the network. However, this communication does not have to be a secured communication at the starting point between two of the users, i.e., these two users in particular do not have a shared secret key at the starting point. Such a communication is to be established at least between them. In one variant, a secured communication link already exists between these two users, however, it is to be renewed, i.e., a renewed secured connection is to be established. For this purpose, a new shared secret key is to be generated in the network, on the basis of which the communication may be secured.

Two users of the network having already secured communication each determine for this purpose a partial value sequence, for example, a bit sequence, from physical properties of their particular transmission channel to the third user, to which a secured communication is to be established (either as a new secured communication or as a renewed secured communication). Between the two secured users, or in a section of the network having secured communication, with which at least the two secured users are associated, a key, or an overall key, is generated from the partial value sequences. Processing steps which are necessary for deriving a key from channel estimations may already take place entirely or substantially in the individual already secured users; however, it may also entirely or substantially be displaced to one or multiple other users. Therefore, the generated partial value sequences, which are exchanged between these users, and from which the overall key is then prepared, may be, depending on the embodiment variant, for example, substantially raw channel parameter sets or already error-corrected keys which are matched to the user to be connected. The overall key is also generated from the partial value sequences in the third user. A secured communication may now take place on the basis of the shared secret key.

In comparison to asymmetrical methods, the presented approach is accompanied by cost savings in the hardware and lower power consumption. In comparison to conventional symmetrical methods, it has a strongly simplified key management. The method is easily usable and operable and may also be carried out easily by persons without special technical knowledge due to its substantial automation. The security is scalable, i.e., keys of arbitrary length may be generated in principle depending on the requirement.

Using the described approach, multiple transmission channels, which are independent from one another in most cases, are used as the foundation for generating the overall key. This is advantageous, on the one hand, because attacks by modeling are made significantly more difficult. In specific scenarios, which are not necessarily known a priori, an attacker could attempt, for example, to simulate the propagation conditions between two nodes with the aid of a suitable model, to thus be able to draw conclusions about the observed channels. This could be critical in particular if the channel between two nodes is very well predictable because of the special circumstances (for example, strong line-of-sight component in the case of wireless channels). The more transmission channels, which are independent from one another, are used as the foundation for the key generation, the more difficult good modeling becomes. In a typical office environment, in which a mobile terminal having a permanently installed WLAN is to negotiate a key, it may occur comparatively frequently, for example, that a terminal has a direct visual connection to an access point, but the probability that the terminal having N access points has a direct visual connection simultaneously typically decreases quite rapidly with increasing N. Simultaneously, however, the present invention also improves the security if a potential attacker attempts to measure a specific transmission channel himself. In the described approach, in which a mobile terminal is to network securely with a WLAN, it would be conceivable, for example, that an attacker stands directly adjacent to the access point, with which the terminal wishes to generate a key. Since this is not necessarily noticed by the user who operates the terminal and since the attacker possibly approaches as close as desired to the access point in such a case, he could possibly therefore estimate the transmission channel between the access point and the terminal quite well himself. Insofar as it is proposed in the present invention that multiple nodes, which are generally spatially separated, of the secure network are also incorporated in the key generation, an attack scenario is thus made significantly more difficult, of course.

Due to the participation of a total of at least three users for key generation, it is thus made significantly more difficult for potential attackers to tap the items of information required for improper key generation. In addition to the mechanisms for generating the keys, the attacker has to additionally know about the mechanisms for preparing the overall key from the partial value sequences. The security of the key generation in relation to possible attackers is therefore improved.

In addition, due to the use of at least two transmission channels for generating a single key, the probability of a sufficient entropy of the parameters used for generating a secure key is increased. This results from the fact that multiple transmission channels which are independent from one another are used as the foundation for the key generation and therefore the probability that all involved transmission channels do not offer sufficient entropy at the point in time of the key generation is reduced with increasing number.

In a particularly preferred variant of the present invention, a further linkage of the two partial value sequence generations takes place. The two secured users of the network ascertain properties of the particular transmission channel to the user to be secured at least partially simultaneously from a broadcast transmission or from the same transmission signal of the user.

This results in an improvement of the performance capacity of the key generation, in particular with regard to the time required for this purpose and the power demand. This results in particular from the possibly optimized channel estimation phase. For example, if one (arbitrarily) assumes that one channel estimation value of a specific channel may be ascertained per pilot sequence and initially 500 such channel estimation values are to be determined for a sufficient key entropy, thus in the case of "classical" key generation, 2*500 =1000 pilot sequences must be transmitted for this purpose between two nodes (factor 2 since the channel must be estimated in both directions). With the present invention, for example, with N =5 network nodes, in contrast, only 100 +5*100 =600 pilot sequences are required. 100 pilot sequences must be transmitted in total from Alice and in addition 100 pilot sequences must be transmitted in total from each network node. Therefore, the effective key generation time for the overall key may be continuously reduced with the present invention with an increasing number of participating users. In the limiting case of a very large number of users, the number of the required pilot sequences would even be nearly halved in comparison to the "classical" approach. The reduction of the required pilot sequences additionally also results in a reduction of the power demand required for this purpose. In particular in the case of energy-autonomous or battery-operated sensors or actuators, for example, this represents a decisive advantage.

In addition, this linkage of the partial value sequence generation also results in further protection of the method against potential attackers. If an attack is to take place via the readout of transmissions, the attacker now has to read out or simulate two simultaneous transmissions via different channels.

Alternatively thereto, however, the method may also be carried out in that the first user or the second user ascertains, from separate individual transmissions of the third user to the first or second user, respectively, the properties of the particular transmission channel to the third user. If the above-described advantages are also dispensed with in this case, the method may be carried out particularly simply, in particular also without broadcast functionality of the users.

The partial value sequences may be exchanged in the following method steps between secured users, so that at least one user may generate the overall key. Previously nonparticipating users may also participate in the exchange, for example, a central node in which an overall key may be generated. Alternatively, a network-external node, for example, via an Internet connection, may also prepare the overall key from the partial value sequences and provide it to the network. The more users have all partial value sequences, the more of them may establish a secured communication link with one another on the basis thereof. Of course, the security of the key used decreases with the number of users which have it available. However, in a secured network, it may be presumed that it is difficult for an attacker to read out a secret key from one of the users.

The properties of the transmission channel which are used for the partial value sequence generation are in particular amplitude properties of the transmission or phase properties of the transmission.

BRIEF DESCRIPTION OF THE DRAWINGS

FIG. 3 schematically shows an exemplary data communication between users of a network for generating a key in the network while using a broadcast transmission.

DETAILED DESCRIPTION

Figure 1:
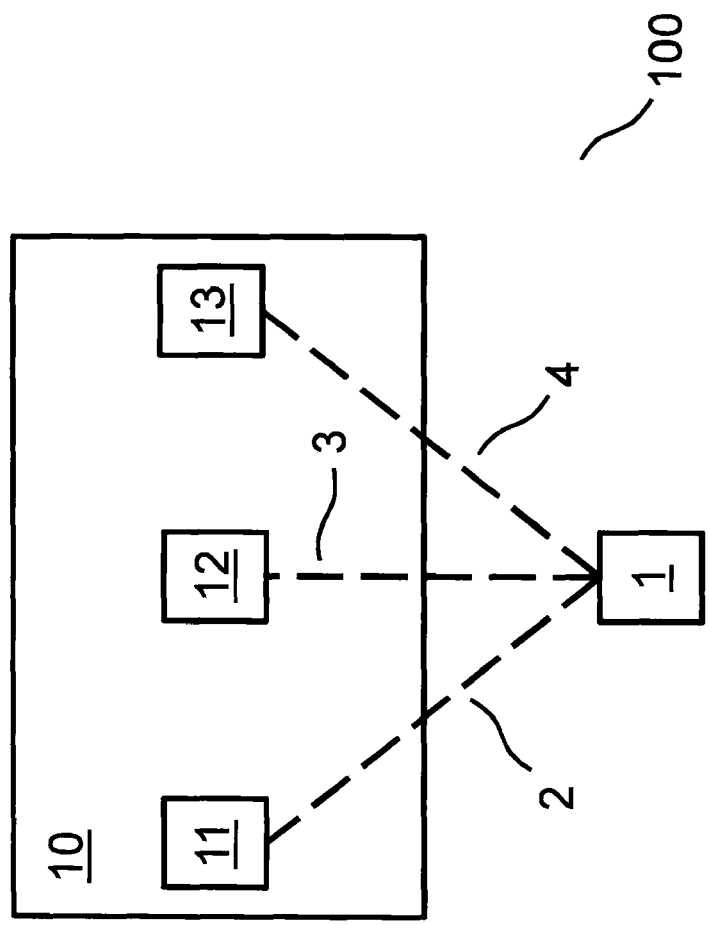
FIG. 1 schematically shows an exemplary network having four users.

The present invention relates to a method for automatically generating symmetrical, cryptographic keys based on physical channels between nodes of a wireless or wired communication system, i.e., between users of a network.

Therefore, without high outlay, symmetrical encryption methods may be used to implement various security goals, which is of interest in particular for applications in the field of machine-to-machine communication, i.e., for example, for the transmission of data between various sensor and/or actuator nodes.

The reciprocity and the inherent randomness of these transmission channels between the nodes are utilized. This may take place as described hereafter, for example. Two nodes estimate a specific number of channel parameters, possibly also over time. These channel parameters are suitably quantified by both nodes. Preferably, this is followed by measures for noise reduction and/or error reduction, for example, by using error-correcting codes. With the aid of suitable mechanisms, a calibration of the quantified channel parameters between the nodes is then carried out, preferably using a public protocol. This is necessary, since because of measurement inaccuracies, noise, interferences, etc., both nodes generally have not initially ascertained identical parameter sets. The calibration is to be designed in such a way that a potential attacker who may listen in on the exchanged data may not readily infer the quantified channel parameters therefrom. For this purpose, for example, parity bits may be exchanged between the nodes. Optionally, a key validation (for example, an entropy estimation) and a key improvement (for example, by key compaction via hash value calculation) may also be carried out. Finally, corresponding symmetrical keys are generated on the foundation of the calibrated, quantified channel parameters.

It is assumed that a potential attacker has a sufficiently large distance to the two nodes in which the symmetrical key is to be generated. The distance is to be at least in the order of magnitude of the so-called coherency length, which is in the range of several centimeters in the common wireless communication systems. Therefore, the attacker sees other (independent) transmission channels to these two nodes in each case and may not readily reconstruct the same key. In addition, with the aid of this approach, complete or at least partial rekeying may be carried out regularly without great effort, i.e., a recalculation of the keys to be used, and complex, computation-intensive asymmetrical methods do not have to be used.

For example, phase shifts caused by the transmission channel, damping, and variables derived therefrom come into consideration as channel parameters. The received signal strength indicator (RSSI) represents, for example, a common indicator for the received field strength of wireless communication applications and may be used for these purposes. To ascertain the channel parameters, pilot signal sequences known to both sides may transmitted between the nodes, which make the required channel estimations easier.

In the described method, it is presumed that the transmission channels between the nodes have sufficient variations of their channel properties to be able to derive suitable channel parameters therefrom, which are suitable as a foundation for a key generation in the user (in particular they have sufficient random properties). These variations may occur in particular both in the time range and also in the frequency range and, in the case of multiple antenna systems, also in the spatial range. However, it is also assumed that the channel properties have a sufficiently high correlation over short time spans that data transmissions may take place in both directions, from which the particular nodes may estimate sufficiently equal channel properties in spite of a time offset to obtain sufficiently similar channel parameters, from which identical keys may be obtained.

An approach is described hereafter for generating corresponding keys between a secure network having at least two nodes, which may already securely communicate with one another, and a third, individual node, which is to be connected to the secure network. Shared, symmetrical keys are generated in the node to be connected and in the network, which is already secure per se. At least two of the nodes provided therein participate in the key generation in the already secure network. Thus, the security of the key generation may be improved in comparison to conventional approaches, on the one hand, and the time required for the key generation may be reduced at the same time.

FIG. 1 shows secured part 10 having users 11, 12, and 13 of a network 100. Secured part 10 of the network is distinguished in that its users 11, 12, and 13 may communicate with one another via secured communication links. These are preferably cryptographically secured lo communication links. Depending on the attack scenario, however, security in forms of different strength may be meant. Thus, for example, a certain protection may be provided if another communication technology is used for the communication between two users of the network, for example: a first and a second user are Wi-Fi access points, which are connected to one another via Ethernet without special security mechanisms (encryption, etc.). A third user is a Wi-Fi client. Therefore, since good protection against any wireless attackers would already be possible, the communication link is therefore secured against such attackers.

In addition, user 1 is also in network 100. User 1 is only a user of network 100 in the sense that he may communicate via communication links 2, 3, and 4 with users 11, 12, and 13, respectively. However, user 1 is not a user of secure part 10 of network 100, since communication links 2, 3, and 4 to other users 11, 12, and 13 respectively are not protected. User 1 is now to be connected to secure part 10 of network 100, i.e., at least one, preferably all of his communication links 2, 3, and 4 are to be protected. The way in which the communication was made secure beforehand between users 11, 12, and 13 and secure part 10 of network 100 is unimportant here. In principle, numerous different (established) methods come into consideration for this purpose, inter alia, the above-described methods of physical layer security. Various types of the protected communication between 11, 12, and 13 are also conceivable, preferably cryptographic encryption using symmetrical or asymmetrical methods known from the related art, but less pronounced security is also possible.

It is thus presumed that multiple, i.e., at least two, users of a network are already securely networked with one another, i.e., may securely communicate with one another via the network, which may contain still further users. In contrast, a further user is not yet part of the secure network, but is to be integrated therein. For this purpose, a symmetrical cryptographic key is to be negotiated with at least one user of secure part 10 of network 100. The channel pulse responses between user 1 and users 11, 12, and 13 are referred to hereafter as $h_2(t)$, $h_3(t)$, and $h_4(t)$, respectively.

Users 11, 12, and 13 of secure part 10 of network 100 may be networked with one another in a wireless, wired, optical, acoustic, or other way, combinations of various networking technologies and methods also being possible. In addition, users 11, 12, and 13 do not have to be directly physically connected to one another, but rather other users (not shown in FIG. 1) may be interposed during a data transmission within network 100.

In a preferred exemplary embodiment, user 1 is, for example, a wireless end user and users 11, 12, and 13 are corresponding wireless access points (access points/base stations), which are securely networked with one another via a backbone network (for example, a local area network or the Internet). In particular, user 1 could be, for example, a WLAN terminal and users 11, 12, and 13 could be corresponding WLAN access points. Alternatively, user 1 could be, for example, a mobile wireless terminal and users 11, 12, and 13 could be corresponding mobile wireless base stations.

In another exemplary embodiment, user 1 is a wireless end user and users 11, 12, and 13 are further wireless end users, which are networked with one another with the aid of a mesh network. This mesh network could be based in particular, for example, on the transmission standard IEEE 802.15.4 or IEEE 802.11s.

However, user 1 does not only negotiate a symmetrical, cryptographic key from the properties of the interposed transmission channel with incorporation of a single, specific user of secure part 10 of network 100, even if secure integration in secure part 10 of network 100 were already possible in this way. Rather, user 1 generates various partial value sequences with at least two users of secure part 10 of network 100, based on the channel properties of the particular transmission channels.

For example, user 1 generates, using the known methods of "physical layer security," a partial value sequence $K_2$, $K_3$, and $K_4$ with user 11, 12, and 13, respectively, based on the channel properties of communication link 2, 3, and 4, i.e., based on channel pulse responses $h_2(t)$, $h_3(t)$, and $h_4(t)$ or variables derived therefrom. Correspondingly, users 11, 12, and 13 also generate particular partial value sequences $K_2$, $K_3$, and $K_4$, respectively. Partial value sequences $K_2$, $K_3$, and $K_4$ thus generated are exchanged within secure part 10 of a network 100, in particular between users 11, 12, and 13. Various partial value sequences $K_2$, $K_3$, and $K_4$ are combined to form an overall key $K_{ges}$. This takes place both in secure part 10 of network 100 and also locally in user 1.

Overall key $K_{ges}$ thus generated in user 1 and in secure part 10 of network 100 may be used hereafter as a foundation for suitable cryptographic methods based on symmetrical, cryptographic keys, i.e., for example, for symmetrical encryption of data which are exchanged between user 1 and a user 11, 12, or 13 of secure part 10 of network 100. Therefore, the communication between user 1 and secure part 10 of network 100 may thus be protected and user 1 may thus be integrated into this secure part 10 of the network.

The generation of partial value sequences thus takes place between at least two users of a secure part of a network with a user to be connected. The data transmissions required for this purpose may take place sequentially in one specific embodiment. In a preferred embodiment, pilot signal sequences are transmitted between the users in this case, which are preferably known to both sides, and the channel estimations required for ascertaining the channel parameters or the variables derived therefrom are carried out from these pilot signal sequences.

Figure 2:
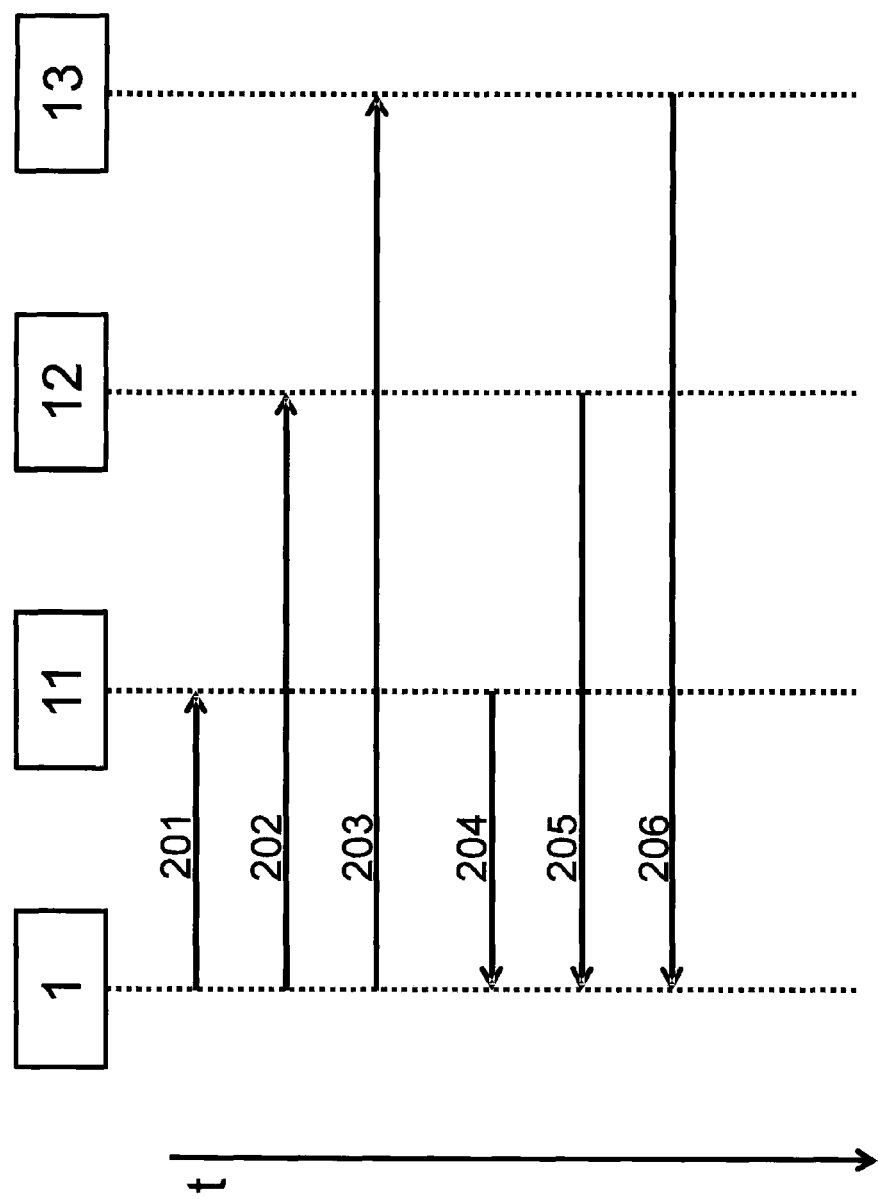
FIG. 2 schematically shows an exemplary data communication between users of a network for generating a key in the network.

FIG. 2 shows the case of user 1 to be connected and users 11, 12, 13 of a secure part of the network. User 1 sequentially transmits pilot signal sequences 201, 202, and 203 to users 11, 12, and 13, respectively. On the basis of pilot signal sequences 201, 202, and 203, users 11, 12, and 13, respectively, may ascertain channel parameters or variables derived therefrom of their particular communication link to user 1. Users 11, 12, and 13 also successively transmit pilot signal sequences 204, 205, and 206 in turn to user 1, who may also determine on the basis thereof the desired channel parameters of his communication links to the particular users. The sequence of the pilot signal sequences may also take place differently than shown in FIG. 2, of course (for example, following the transmission user 1 to user 11, immediately the transmission user 11 to user 1, etc.). Different or identical pilot signal sequences may be used.

If a user to be connected communicates via a shared transmission medium ("shared medium") with the users of a secure part of a network, i.e., for example, via a wireless transmission channel or via a wired linear bus, a preferred variant of the described method for key generation may thus be achieved. The pilot signals are not sequentially transmitted from the user to be connected to the multiple users of the secure part of the network. Rather, multiple or all users of the secure part of the network participating in the key generation may simultaneously estimate, on the basis of a single pilot sequence transmitted by the user to be connected, the corresponding transmission channels between them and the user.

An exemplary sequence of this channel estimation phase in the case of such closer interweaving is shown in FIG. 3. In this case, a user 1 to be connected to the secure part of a network initially transmits a suitable pilot sequence 301, which is received, because of the broadcast property of the shared transmission medium, by all users 11, 12, and 13 of the secure part of the network. Individual users 11, 12, and 13 may therefore estimate, on the basis of the corresponding reception signals, the instantaneous channel properties of their respective communication links to user 1 and may determine the required channel parameters therefrom. In this case, both the particular pulse response itself may be estimated, and arbitrary parameters derived therefrom.

Subsequently, users 11, 12, and 13 each transmit a suitable pilot sequence 304, 305, and 306, respectively, which is then also received at least by Alice (in addition to possible other users). On the foundation thereof, user 1 may therefore estimate the instantaneous channel properties of the corresponding transmission channel.

In practice, the sequence outlined in FIG. 3 would generally be repeated multiple times, to obtain a parameter set in the users having a higher entropy and therefore a better shared key, thanks to the chronological variability of the transmission channel. Due to the broadcast transmission of signal sequence 301 of user 1 to users 11, 12, and 13, multiple individual transmissions are saved during each repetition. In the described embodiment variant, pilot sequences may be received simultaneously in multiple users and parameter sets may be determined therefrom simultaneously, while for a parameter set of equal length or entropy in the case of key generation between a total of only two users, a significantly longer pilot sequence or multiple corresponding pilot sequences are sent from one user to the other and must be analyzed thereby. The described method thus provides a time savings with more secure key generation nonetheless.

Combinations of the solely sequential sequence according to FIG. 2 and the interwoven channel estimation according to FIG. 3 are also possible. If user 1 communicates, for example, with user 11 and user 12 via a shared, divided transmission medium, but the communication with user 13 takes place in another way, the generation of the partial value sequences between user 1 and users 11 and 12 could take place according to FIG. 3, while in contrast the generation of the partial value sequence between user 1 and user 13 would be completely independent thereof.

The actual derivation and preparation of the partial value sequence from the initial estimated transmission parameters and the calibration of these keys between the user to be connected and the users of the secure part of the network take place in principle as also in conventional approaches of physical layer security (see explanations above).

Various alternatives are conceivable for the exchange of the generated partial value sequence within the secure network. Depending on which approach is pursued here, this has different effects on the properties of the system with regard to security aspects and the performance capacity.

Thus, every user of the secure part of the network, who has generated a partial value sequence from the channel properties to the user to be connected, has transmitted it to another user of the secure part of the network. Therefore, every user of the secure part of the network has all partial value sequences and may generate the overall key therefrom. In this approach, a relatively large amount of traffic is generated to exchange the particular partial value sequences.

In an alternative embodiment, all users of the secure part of the network, who have generated a partial value sequence from the channel properties to the user to be connected, transmit their partial value sequences to a central user of the secure part of the network, who may come from the series of the users himself or maybe a separate user (who has thus not himself generated a partial value sequence). This central user may now combine the overall key from the partial value sequences. The central user optionally distributes the overall key to all or specific users of the secure part of the network. In this approach, in contrast, the traffic volume is generally reduced and (initially) only one user has full knowledge of all partial value sequences. This is advantageous, for example, if ultimately not all nodes are to know the overall key and they are only to be used to assist in the key generation.

Further alterations are also possible, in which, for example, partial value sequences are transmitted via multiple other users of the secure part of the network and/or only a subset of partial value sequences is used in the combination to form the overall key. The latter must be known accordingly to the user to be connected.

A variety of possibilities is in turn conceivable for the generation of the overall key from the partial value sequences. Very generally, the overall key may be an arbitrary function of the partial value sequences, which have to be known both to the user to be connected and to the corresponding user or users in the secure part of the network. Examples of advantageous implementations of the function include (a) a concatenation of the various partial value sequences, (b) a logical linkage of the individual bits of the various partial value sequences, for example, with the aid of an XOR function, (c) a combination of the various partial value sequences (for example, with a simple concatenation) and subsequent calculation of a suitable hash function, etc.

The overall key is therefore ascertained both within the secure part of the network (by exchange of items of information between its users) and correspondingly locally by the user to be connected and may furthermore finally be used as a foundation for suitable cryptographic methods. As already noted, various intermediate steps may be necessary to derive a key from channel estimations, for example, error corrections (error correction codes —ECC) and a calibration between the various sides (i.e., between the user to be connected and the secure part of the network), to ensure that both sides finally have the same key. These intermediate steps may take place in the described method in the secure part of the network either by way of the individual users or by way of one or multiple selected users, so that the partial value sequences generated in the individual users of the secure part of the network, depending on the embodiment, may correspond to raw channel parameter sets and also already corrected and calibrated bit sequences and intermediate steps thereto.

The methods described here for generating symmetrical keys for protecting the communication with a network user may be used in a variety of wireless, wired, and other communication systems. The described approach is of particular interest for machine-to-machine communication, i.e., for the transmission of data between various sensors, actuators, etc., which generally only have very limited resources and possibly may not be configured manually in the field with acceptable outlay. Applications include, for example, home and building automation, telemedicine, car-to-X systems, or industrial automation. The use in future ultrasmall sensors having wireless interfaces is also of particular interest.

What is claimed is:

1. A method for generating a key in a network, the network including, in a secured network part, at least one first user and one second user having a secured communication link to one another and including a third user, to which the secured communication link is to be one of established and renewed, the method comprising:
   causing the first user and the third user to each generate a first partial value sequence from a property of a transmission channel between the first user and the third user;
   causing the second user and the third user to each generate a second partial value sequence from a property of a transmission channel between the second user and the third user;
   ascertaining, in the secured network part of the network, the key on the basis of at least the first partial value sequence of the first user and the second partial value sequence of the second user; and
   generating the key in the third user from at least the first partial value sequence and the second partial value sequence,
   wherein the second user transmits the second partial value sequence to the first user, and wherein the first user generates the key from at least the first partial value sequence and the second partial value sequence,
   wherein the first user additionally transmits the first partial value sequence to the second user, and wherein the second user generates the key from at least the first partial value sequence and the second partial value sequence, and
   wherein the first and second partial value sequences are bit sequences determined by information calibration.

2. The method as recited in claim 1, wherein the first user and the second user ascertain the properties of the particular transmission channel to the third user based on the same transmission signal of the third user.

3. The method as recited in claim 1, wherein the first user and the second user ascertain the properties of the particular transmission channel to the third user from separate individual transmissions of the third user to the first user and to the second user, respectively.

4. The method as recited in claim 1, wherein the first user conducts the first partial value sequence and the second user conducts the second partial value sequence to a central node of the network, and wherein the central node generates the key from at least the first partial value sequence and the second partial value sequence.

5. The method as recited in claim 4, wherein the first user and the second user have a secure communication link to the central node.

6. The method as recited in claim 1, wherein:
the first user conducts the first partial value sequence and the second user conducts the second partial value sequence to a network-external node, and
the network-external node generates the key from at least the first partial value sequence and the second partial value sequence and in turn provides the key to the network.

7. The method as recited in claim 6, wherein the first user and the second user have a secure communication link to a network-external node.

8. The method as recited in claim 1, wherein a property of the transmission channel includes one of a phase shift, a damping, and a variable derived from one of the phase shift and the damping.

9. The method as recited in one of claim 1, wherein the first and second partial value sequences are ascertained channel parameters.

10. The method as recited in claim 1, wherein the key is generated from the first and second partial value sequences by a logical linkage of the first and second partial value sequences.

11. The method as recited in claim 10, wherein the logical linkage includes one of an XOR linkage, a concatenation of the first and second partial value sequences, and an application of a hash function.

12. A network, comprising:
at least one first network device;
at least one second network device;
a secured communication link connecting the first network device and the second network device;
a third network device, to which the secured communication link is to be established;
an arrangement for causing the first network device and the third network device to each generate a first partial value sequence from a property of a transmission channel between the first network device and the third network device;
an arrangement for causing the second network device and the third network device to each generate a second partial value sequence from a property of a transmission channel between the second network device user and the third network device;
an arrangement for ascertaining, in a secured part of the network, a key on the basis of at least the first partial value sequence of the first network device and the second partial value sequence of the second network device; and
generating the key in the third network device from at least the first partial value sequence and the second partial value sequence,
wherein the second network device transmits the second partial value sequence to the first network device, and wherein the first network device generates the key from at least the first partial value sequence and the second partial value sequence,
wherein the first network device additionally transmits the first partial value sequence to the second network device, and wherein the second network device generates the key from at least the first partial value sequence and the second partial value sequence, and
wherein the first and second partial value sequences are bit sequences determined by information calibration.

13. The network as recited in claim 12, wherein the first network device and the second network device are base stations of a wireless network.

14. A non-transitory machine-readable storage medium having a computer program that when executed by a computer is configured to carry out a method for generating a key in a network, the network including, in a secured network part, at least one first user and one second user having a secured communication link to one another and including a third user, to which the secured communication link is to be one of established and renewed, the method comprising:
causing the first user and the third user to each generate a first partial value sequence from a property of a transmission channel between the first user and the third user;
causing the second user and the third user to each generate a second partial value sequence from a property of a transmission channel between the second user and the third user;
ascertaining, in the secured network part of the network, the key on the basis of at least the first partial value sequence of the first user and the second partial value sequence of the second user; and
generating the key in the third user from at least the first partial value sequence and the second partial value sequence,
wherein the second user transmits the second partial value sequence to the first user, and wherein the first user generates the key from at least the first partial value sequence and the second partial value sequence,
wherein the first user additionally transmits the first partial value sequence to the second user, and wherein the second user generates the key from at least the first partial value sequence and the second partial value sequence, and
wherein the first and second partial value sequences are bit sequences determined by information calibration.

15. A method for generating a key in a network, the network including, in a secured network part, at least one first user and one second user having a secured communication link to one another and including a third user, to which the secured communication link is to be one of established and renewed, the method comprising:
causing the first user and the third user to each generate a first partial value sequence from a property of a transmission channel between the first user and the third user;
causing the second user and the third user to each generate a second partial value sequence from a property of a transmission channel between the second user and the third user;
ascertaining, in the secured network part of the network, the key on the basis of at least the first partial value sequence of the first user and the second partial value sequence of the second user; and
generating the key in the third user from at least the first partial value sequence and the second partial value sequence,
wherein the second user transmits the second partial value sequence to the first user, and wherein the first user generates the key from at least the first partial value sequence and the second partial value sequence,
wherein the first user additionally transmits the first partial value sequence to the second user, and wherein the second user generates the key from at least the first partial value sequence and the second partial value sequence, and wherein the first and second partial value sequences are ascertained channel parameters.

\* \* \* \* \*